US007517203B1

(12) United States Patent
Hall et al.

(10) Patent No.: US 7,517,203 B1

(45) Date of Patent: Apr. 14, 2009

(54) HIGH PRESSURE PRESS

(76) Inventors: David R. Hall, 2185 S. Larsen Pkwy., Provo, UT (US) 84606; Timothy C. Duke, 2185 S. Larsen Pkwy., Provo, UT (US) 84606; Scott Dahlgren, 2185 S. Larsen Pkwy., Provo, UT (US) 84606; Ronald B. Crockett, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 12/241,159

(22) Filed: Sep. 30, 2008

Related U.S. Application Data

(63) Continuation of application No. 12/241,125, filed on Sep. 30, 2008.

(51) Int. Cl.
*B29C 43/04* (2006.01)

(52) U.S. Cl. ......................... 425/77; 425/193; 425/330; 425/DIG. 26; 419/48; 419/61

(58) Field of Classification Search .................. 425/77, 425/405.1–405.2, 193, 330, DIG. 26; 419/48–49, 419/51, 54–55, 68
See application file for complete search history.

(56) References Cited

U.S. PATENT DOCUMENTS 2,918,699 A 12/1959 Hall
2,968,837 A 1/1961 Zeitlin
3,093,862 A 6/1963 Gerard
3,159,876 A 12/1964 Hall
3,182,353 A 5/1965 Hall
3,255,490 A 6/1966 Sturm
3,257,688 A 6/1966 Levey
5,744,170 A 4/1998 Hall
5,780,139 A 7/1998 Carter
5,851,568 A 12/1998 Huang
6,022,206 A 2/2000 McNutt
6,186,763 B1 2/2001 Scanlan
6,336,802 B1 1/2002 Hall
7,467,936 B2 * 12/2008 Hall et al. ..................... 425/77
2007/0009626 A1 1/2007 Hall

* cited by examiner

*Primary Examiner*—Yogendra Gupta
*Assistant Examiner*—Thu Khanh T Nguyen
(74) *Attorney, Agent, or Firm*—Tyson J. Wilde

(57) ABSTRACT

In one aspect of the invention, a cartridge assembly is adapted for connection to a frame of a high pressure, high temperature press having a front end with a back up intermediate and coaxial with an anvil and a piston. The back up has an anterior end proximate the anvil and posterior end proximate the piston. The cartridge assembly has a hydraulic system adapted to apply axial pressure to the back-up through the piston to axially move the front end with respect to a cartridge body. The assembly also has a centralizing assembly with a rod rigidly attached to the cartridge body at a first end and a second end adapted to slide within a peripheral bore formed in the front end.

19 Claims, 17 Drawing Sheets

HIGH PRESSURE PRESS

CROSS REFERENCE TO RELATED APPLICATIONS

This application is a continuation of U.S. patent application Ser. No. 12/241,125, which was filed on Sep. 30, 2008 and herein incorporated by reference for all that it teaches.

BACKGROUND OF THE INVENTION

The invention relates to a piston for charging and discharging fluid in a fluid chamber. In a preferred embodiment of the invention, the piston is used in a high pressure, high temperature environment, (HPHT) specifically HPHT press apparatuses. For example, such presses are useful in the superhard materials production industry. Some examples of superhard materials that high pressure, high temperature presses sinter includes: cemented ceramics, diamond, polycrystalline diamond, and cubic boron nitride. HPHT press apparatuses typically require significant structural mass to withstand the ultra high pressures essential to synthetically form superhard materials.

U.S. Pat. No. 7,231,766 to Hall et al., which is herein incorporated by reference for all that it contains, discloses a piston valve for charging and discharging a first fluid chamber. The piston valve includes a piston shaft and a ring comprising a seal element. The piston shaft has a first end and a second end with the first end including a counter bore having at least one vent. The ring is disposed within a cylinder and the seal element is disposed intermediate the piston shaft and the ring. The piston valve may be used for intensification purposes such as in a high pressure high temperature hydraulic cartridge.

BRIEF SUMMARY OF THE INVENTION

In one aspect of the invention, a cartridge assembly is adapted for connection to a frame of a high pressure, high temperature press comprising a front end comprising a back up intermediate and coaxial with an anvil and a piston. The back up comprises an anterior end proximate the anvil and posterior end proximate the piston. The cartridge assembly comprises a hydraulic system adapted to apply axial pressure to the back-up through the piston to axially move the front end with respect to a cartridge body and a centralizing assembly comprising a rod with a first end rigidly attached to the body and a second end adapted to slide within a peripheral bore formed in the front end.

In another aspect of the present invention, the rod may comprise a first end and second end wherein the length of the rod from the first end to the second end is equal to or greater than the total axial travel of the front end. The rod may also comprise chrome plating adapted to provide protective properties such as corrosion resistance. The rod may comprise a port disposed along the axis of the rod and adapted to supply coolant to the cartridge assembly. The front end may comprise a key ring adapted to slide over the rod, wherein the key ring comprises a peripheral bore. The rod may comprise a removable feature adapted to free the rod from the cartridge body. The removable feature may comprise a notch in the rod and a recess in the cartridge body adapted to accept the notch on the rod.

The rod may comprise a bushing disposed proximate the first end and adapted to cushion the rod from lateral forces. The bushing may be adapted to cushion the rod such that a recess in which the rod is disposed substantially retains shape when the rod is subjected to a lateral force. The bushing may comprise an overload failure point disposed axially along the rod such that it causes a controlled break. The bushing may comprise 660 bronze. The rod may comprise a raised geometry axially along the rod wherein the raised geometry is adapted to interlock with a recessed portion of the key ring. The rod may comprise a recessed portion axially along the rod wherein the raised geometry is adapted to interlock with a raised geometry of the key ring. A cleaning mechanism may encase a portion of the length of the rod and is adapted to remove debris from the rod through scraping, chemical application or vacuuming. The cleaning mechanism may be a brush. The cleaning mechanism may be a wipe. The cartridge assembly may comprise a vacuum system adapted to collect loose particles resultant from pressing. The vacuum system may comprise a funneled geometry. The funneled geometry may be mounted onto the key ring. The rod may comprise a lubrication system wherein the rod is self-lubricated.

DETAILED DESCRIPTION OF THE INVENTION AND THE PREFERRED EMBODIMENT

Figure 1:
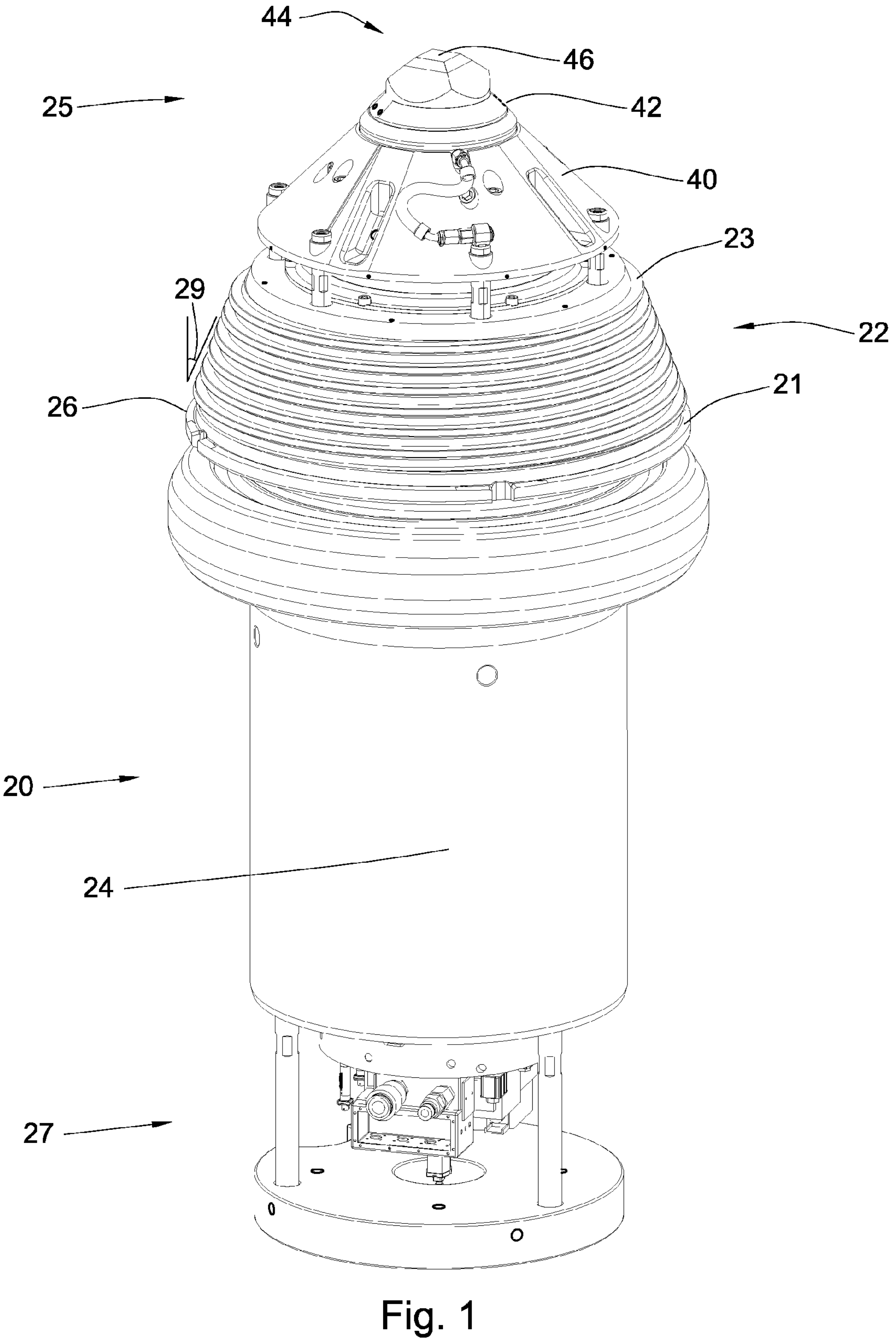
FIG. 1 is a perspective diagram of an embodiment of a hydraulic cartridge.

FIG. 1 discloses a free standing hydraulic cartridge 20 including a working end 25 and hydraulic end 27. The hydraulic cartridge comprises a truncated hollow conical section 22 and a substantially cylindrical base 24. External threadform 26 has a taper 29 extending radially inward from a first cartridge thread 21 of the external threadform 26 adjacent the cylindrical base 24 to a second cartridge thread 23 of the external threadform 26 adjacent the working end 25 of the truncated conical section 22. The working end has three primary constituents, a key ring 40, a binding ring 42, and an anvil 44. The anvil face 46 compresses against a reaction cell face during the press cycle elevating the internal pressure of the reaction cell to a level conducive to sintering and producing superhard materials. In operation, the six anvil faces 46 from six orthogonally aligned cartridges impinge on the corresponding faces of a reaction cell during the press cycle elevating the internal pressure of the reaction cell to a level conducive to sintering superhard materials.

Figure 2:
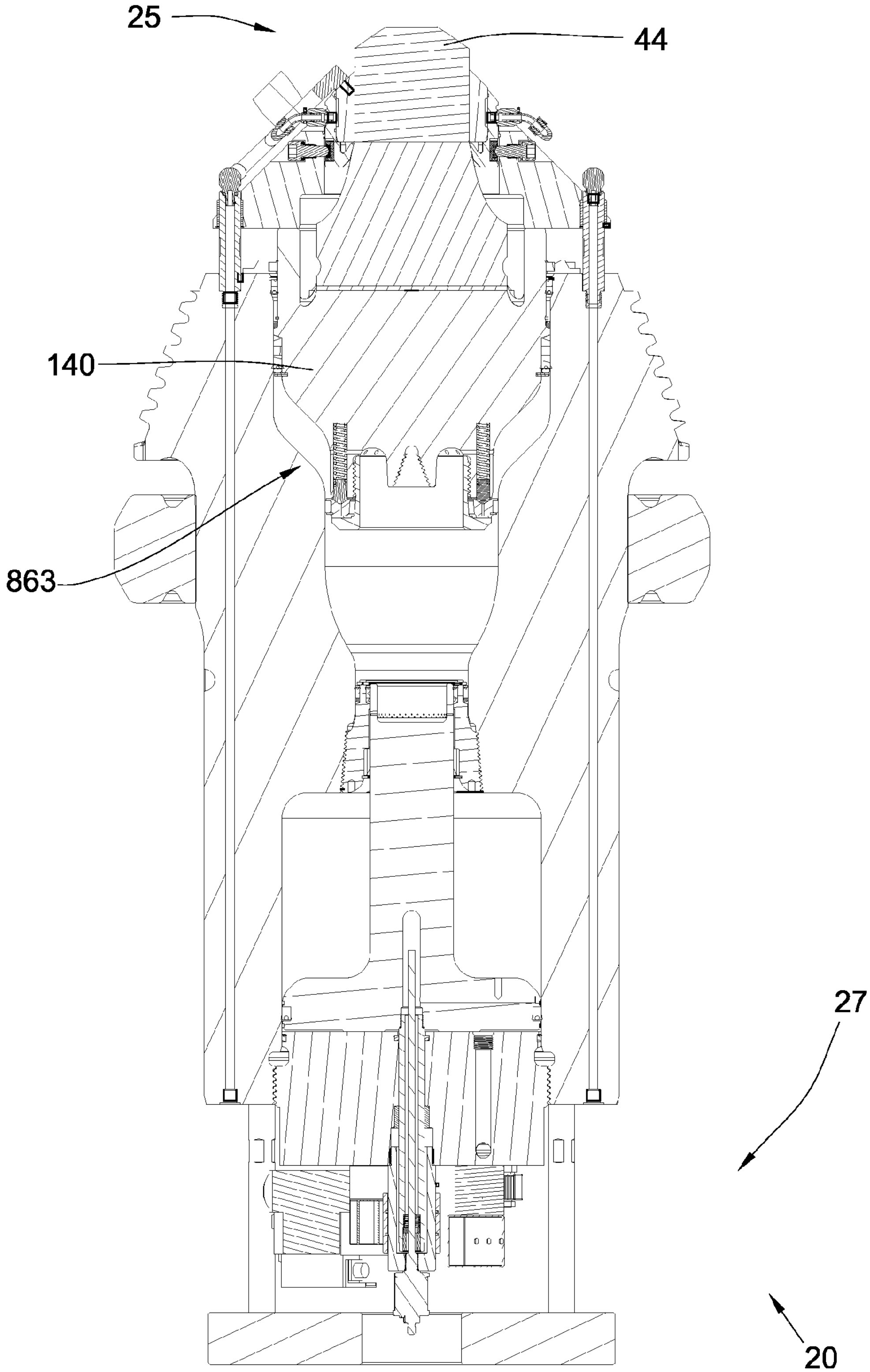
FIG. 2 is a cross-sectional diagram of an embodiment of a hydraulic cartridge.

FIG. 2 is a cross-sectional diagram of an embodiment of a hydraulic cartridge 20. The hydraulic cartridge 20 may comprise a working end 25 and a hydraulic end 27. The hydraulic cartridge 20 comprises a piston 140 adapted to advance and retract an anvil 44 towards a work piece. The piston 140 in this embodiment comprises a centering mechanism, such as a tilt compensator 863, adapted to center the piston 140 while undergoing a press cycle. The centering mechanism is located in the same bore as the piston and comprises a bearing surface adapted to contact a wall of the bore.

Figure 3:
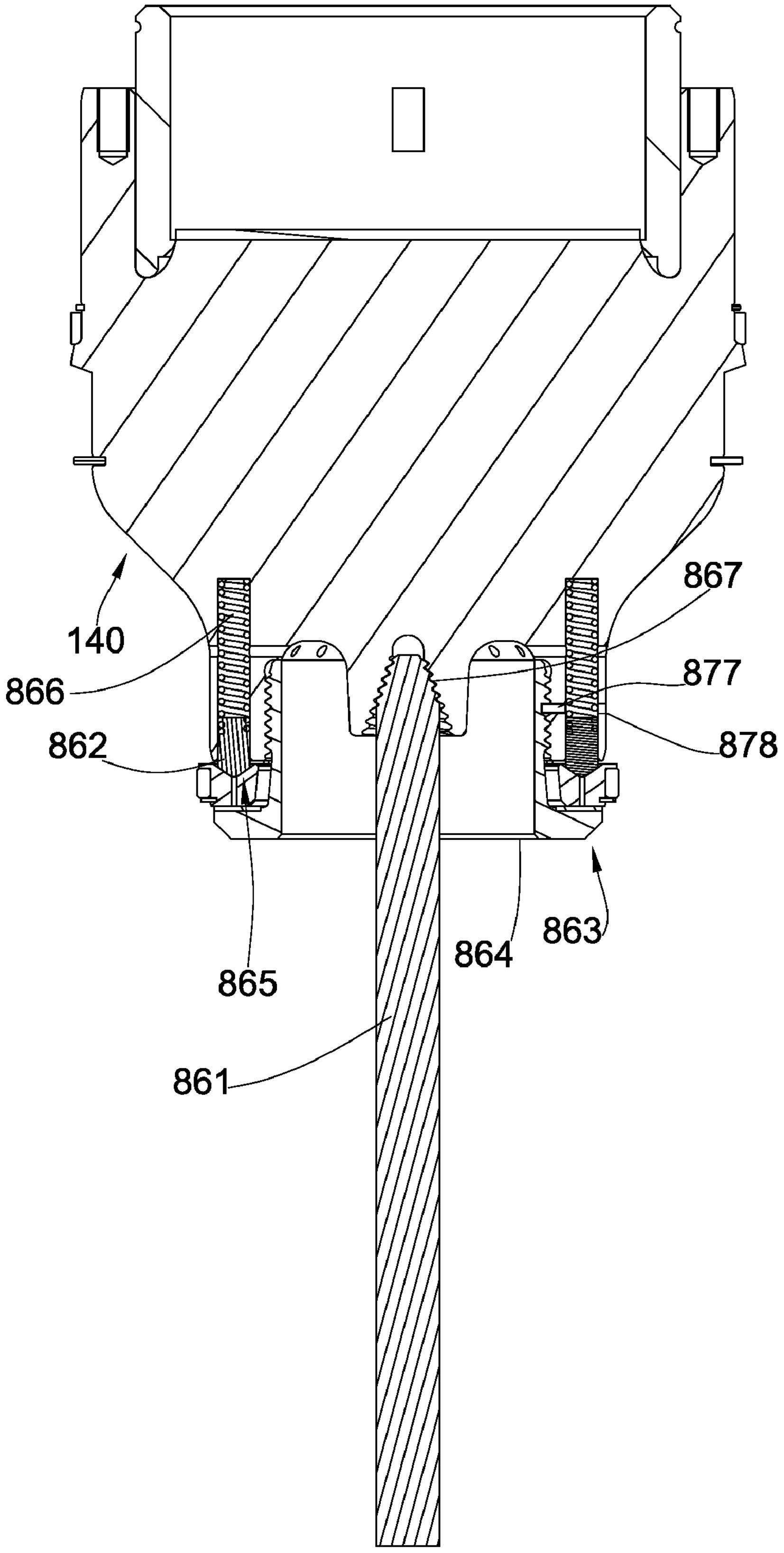
FIG. 3 is a cross-sectional diagram of an embodiment of a tilt compensator.

FIG. 3 is a cross-sectional diagram of an embodiment of a centering mechanism, such as a tilt compensator 863. The tilt compensator 863 may comprise a threadably connected ring 864 threaded to a piston 140. In other embodiments, the tilt compensator 863 may be press fit into the piston 140. The threadably connected ring 864 comprises fixtures, such as centering rods 862, which are received in receptacles of the piston. In the event of piston misalignment, the centering rods 862 are forced to the outer circumference of the centering rod seat 865 which in turn, applies a force to the piston 140 through urging elements, such as spring 866, such that the piston 140 realigns itself with the central axis of the cartridge 20. The spring 866 remains static when the piston 140 is aligned with the cartridge 20. The spring 866 may be a compression spring. In other embodiments, the spring 866 may be disposed inside or outside of a receptacle formed in the tilt compensator 863. The piston 140 comprises a threaded female end 867 adapted to threadably connect to a retraction rod 861 adapted to assist in retracting the piston 140 from an extended position in the off case the piston 140 becomes lodged within the cartridge 20. The retraction rod 861 is therefore used mainly during time periods between pressing cycles and is not included in the regular press cycle. The piston 140 may comprise a locking feature adapted to lock the tilt compensator 863 to the piston 140 comprising a pin 877 inserted into a through hole 878. The fixture 862 may comprise a first end comprising a diameter larger than a diameter of a second end such that the fixture 862 comprises a substantially conical shape. The receptacle may also comprise a larger diameter than a diameter of the first end of the fixture 862. The tilt compensator 863 may also comprise an inner diameter adapted to allow a second piston to be inserted into the tilt compensator 863.

Figure 4:
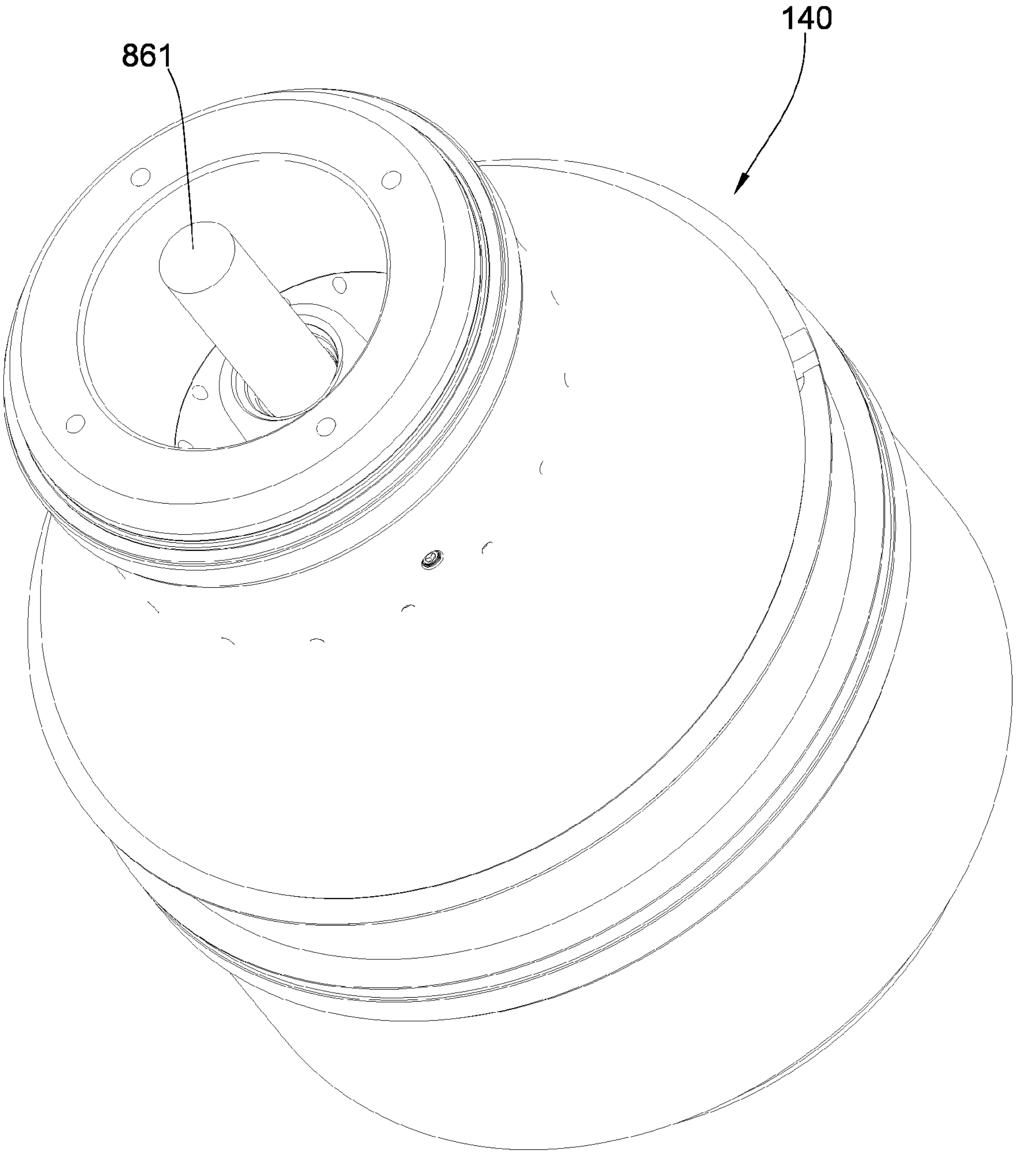
FIG. 4 is a perspective diagram of an embodiment of a piston.

FIG. 4 is a perspective diagram of an embodiment of a piston 140. The piston 140 in rare circumstances has the possibility of becoming lodged within the cartridge 20 such that retraction of the piston 140 by means of hydraulic pressure is unfeasible. In such a case, a detachable handle 861 may be inserted into the cartridge 20 in a threaded retraction port such that the piston 140 is retracted by use of the detachable handle 861. The detachable handle 861 is shown to illustrate the method of insertion into the piston 140 to retract the piston 140 within the hydraulic cartridge 20. The handle 861 may be substantially coaxially aligned with the central axis of the cartridge 20. The handle 861 may fit within a retraction port 867 comprising a conical geometry.

Figure 5:
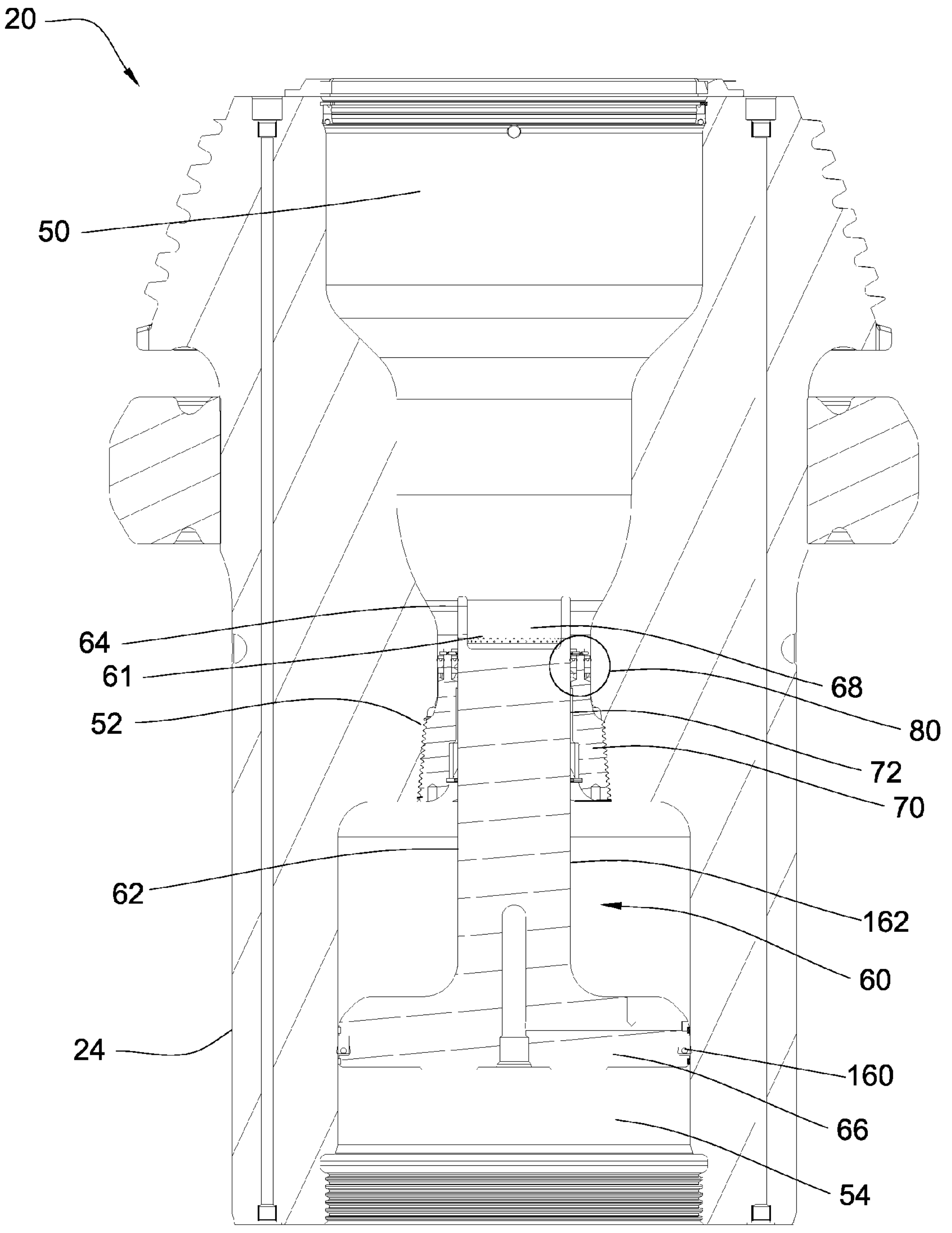
FIG. 5 is a cross-sectional diagram of another embodiment of a hydraulic cartridge.

FIG. 5 is a cross-sectional diagram of a hydraulic cartridge 20 without the working end 25, hydraulic end 27, or various internal components for purposes of illustration. An intensifying piston valve 60 for charging and discharging a first fluid chamber 50 is shown inside a cylinder 24. The piston valve 60 includes a piston shaft 62 comprising a first end 64 and a second end 66. The first end 64 includes a counter bore 68 having at least one vent 61. A ring 70 comprising a seal element 80 is disposed within the cylindrical passageway 52 such that the seal element 80 is disposed intermediate the piston shaft 62 and the ring 70. In a preferred embodiment, the ring 70 is threaded into the cylinder 24 within the cylindrical passageway 52 intermediate the first fluid chamber 50 and a second fluid chamber 54. The first end 64 of the piston valve 60 preferably extends into the first fluid chamber 50. In a preferred embodiment, the piston valve is used for fluid pressure intensification. The piston valve in essence becomes a pressure intensification piston valve permitting fluid to pass between the two fluid chambers 50 and 54 until the fluid pathway between the two fluid chambers is closed. Because the ring 70 may be easily changed for a different size, the piston valve 60 becomes interchangeable with different size piston valves for different fluid intensification levels. The seal element 80 forms a seal between the piston shaft outer diameter 162 and the ring inside diameter 72. The piston valve 60 is preferably made of metal and various alloys such as steel or stainless steel. For example, forged 4140HT is a preferable material choice.

Figure 6:
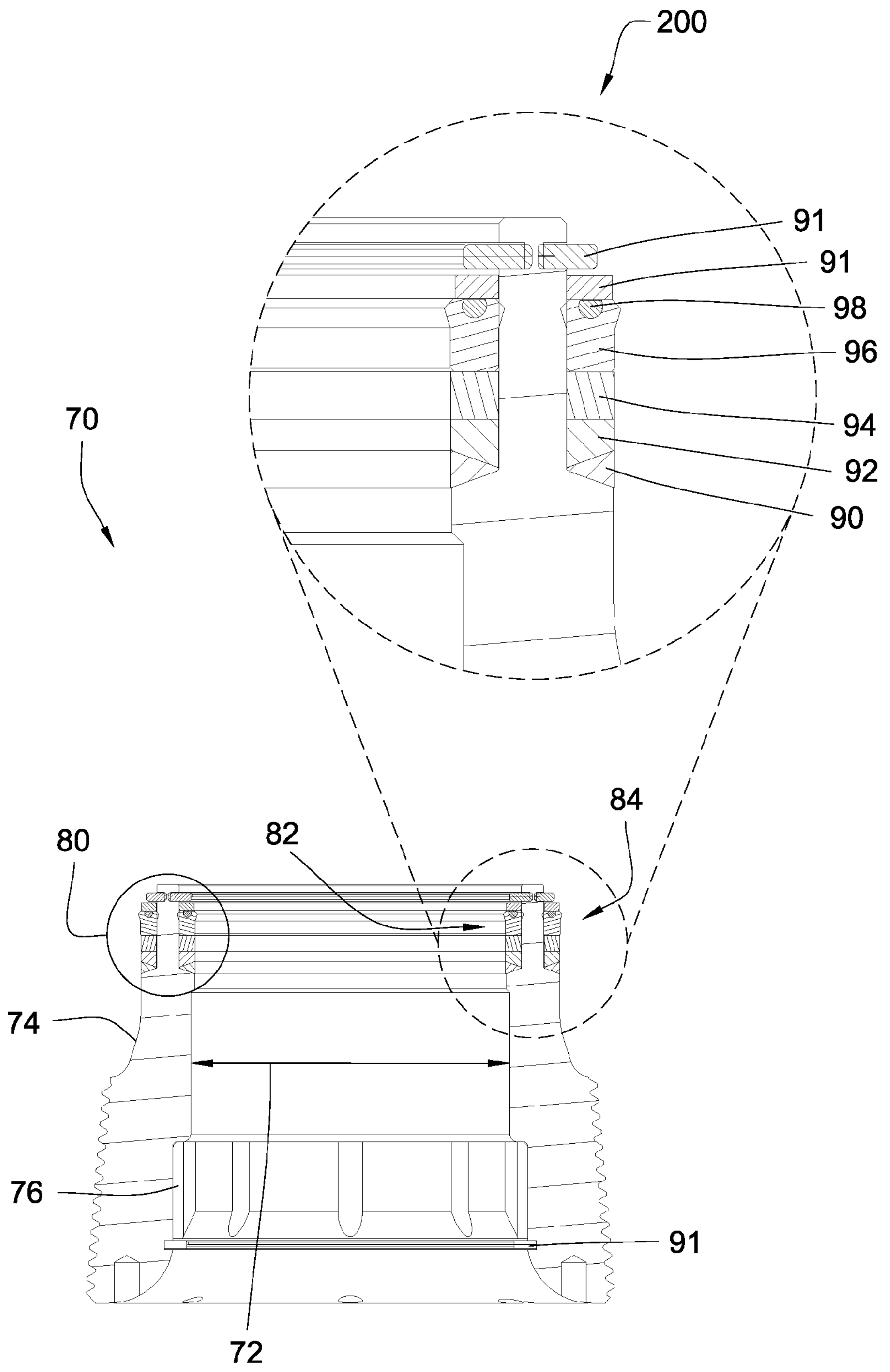
FIG. 6 is a diagram of an embodiment of the seal element.

FIG. 6 is a cross-sectional diagram of the ring 70 and a detailed diagram of the seal element 80. The ring has an outer diameter 74 and an inside diameter 72. The seal element 80 preferably comprises a first seal 82 and a second seal 84. The first seal 82 forms a seal between the piston shaft outer diameter (not shown) and the ring inside diameter 72. The second seal 84 forms a seal between the ring outside diameter 74 and the cylindrical passageway 52 intermediate the first and second fluid chambers as shown in FIG. 4. Enlargement 200 details the seal element components. The seal element 80 comprises an angled modular back 92 up lying adjacent an anti-extrusion ring 90, a modular back up 94 lying adjacent the angled modular back 92 up, a Y-shaped seal ring 96 lying adjacent the modular back up 94, and a seal ring 98 lying adjacent the Y-shaped seal ring 96. At least one retention ring 91 mechanically engages the ring 70 and is adjacent the seal ring 98. In a preferred embodiment, two retention rings are employed to ensure the placement of the seal element and its components. The ring 70 may also include a bearing surface 76 to reduce friction and extend life of the ring 70. Another retention ring 91 may be used to retain the bearing surface 76 in a desired position. The ring 70 is preferably made of metal and various metal alloys such as steel and stainless steel. For example, the ring 70 may be made of EN30B or 4340HT. The bearing surface 76 is preferably made of metal and metal alloys. For example, the bearing surface may be made of bronze alloys such as SAE 660 bronze, graphite filled SAE 660 bronze, and SAE 841 bronze.

A material property under consideration in choosing a suitable material for the seal element is the hardness. It is believed that increasing the hardness of the elastomeric material decreases its tendency to flow under high pressures thus decreasing its likelihood of extrusion. The seal element 80 preferably comprises a material having a minimum hardness of between 60 and 90 durometer on a Shore A hardness scale.

Some example of the types of materials the seal element may be made of include perfluoroelastomers, fluoroelastomers, acrylonitrile butadiene, highly saturated nitrile elastomer compounds, carboxylated nitrile compounds, polyester elastomer, ethylene propylene rubber, polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone. In particular, the Y-shaped seal ring 96, often termed a lip seal, is preferably made from elastomeric material such as perfluoroelastomers, fluoroelastomers, acrylonitrile butadiene, highly saturated nitrile elastomer compounds, carboxylated nitrile compounds, polyester elastomer, and ethylene propylene rubber. The term elastomer should be understood to represent a material that has relatively no yield point and generally has a low glass transition temperature such as an amorphous polymer that is soft and pliable at room temperature. The seal ring 98 is preferably made of elastomeric materials that are classified according to ASTM D standard 1418 such as FFKM, FKM, NBR, XNBR and HNBR. FFKM materials are generally known as perfluoroelastomers whereas FKM materials are known as fluoroelastomers. In general, the seal ring 98 is preferably made of a nitrile elastomeric compounds, carboxylated nitrile compounds, or ethylene propylene rubber.

A stiffer material is preferable for both the modular back up 94 and angled modular back up 92 such as polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone. The anti-extrusion ring 90 helps to ensure seal integrity at high pressures and thus may be made of stiffer material than the modular back ups 94, 92. Some examples are manganese bronze, bronze, and various copper alloys. Specifically, manganese bronze 675 hardened is preferable along with copper casting alloys such as UNS C86100 or UNS C86200.

Figure 7:
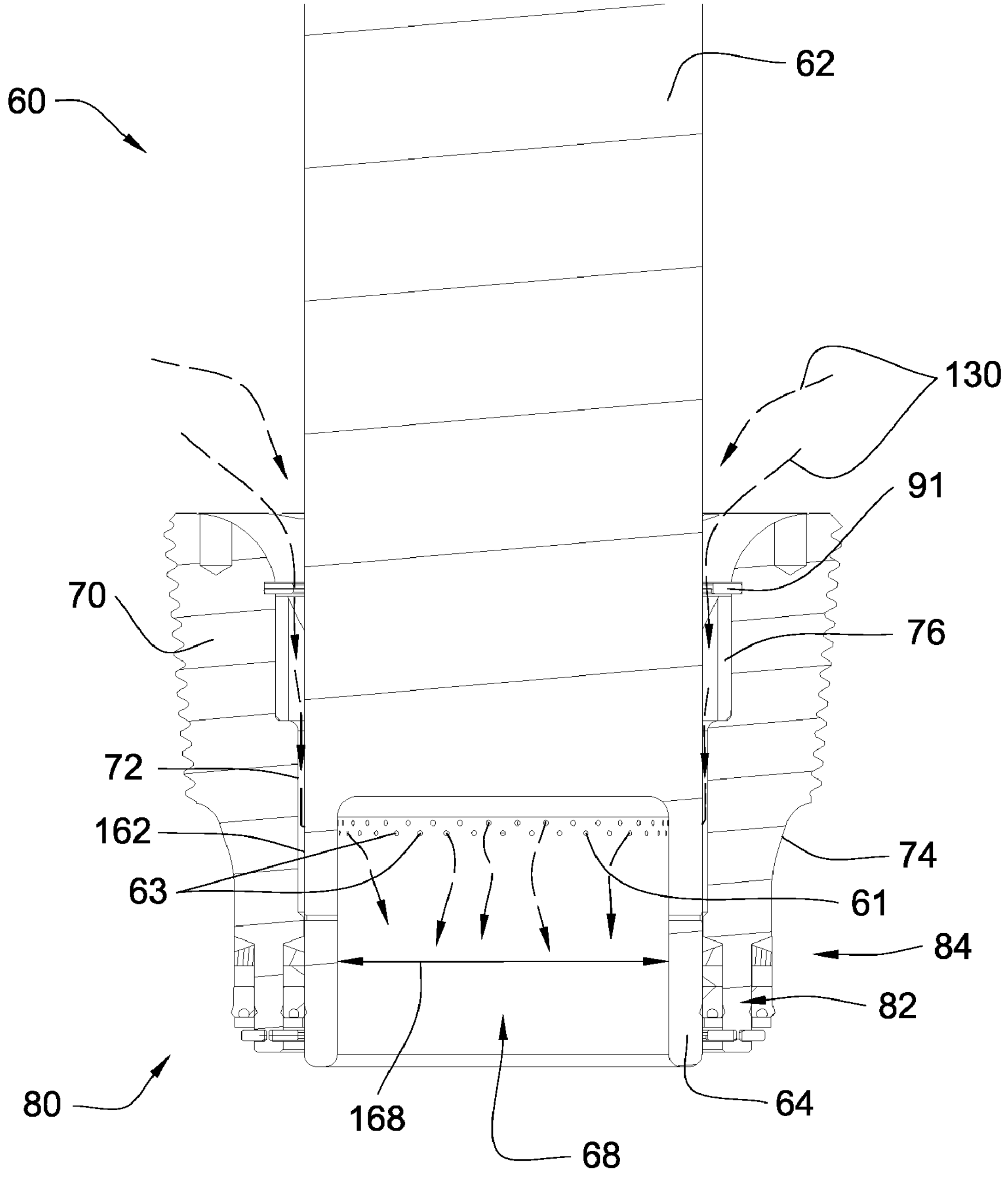
FIG. 7 is a cross-sectional diagram of another embodiment of the ring and piston shaft.

FIG. 7 is a cross-sectional diagram depicting the fluid flow through a piston valve 60 and ring 70. Hydraulic fluid passes between the first and second fluid chambers (not shown) through the piston valve 60 and ring 70. The fluid pathway, depicted by flow lines 130, passes between the piston shaft 62 and the ring inside diameter 72. Because the seal element 80 forms an unbroken seal between the piston shaft 62, in particular the first end 64, the fluid cannot pass the first end 64 of the piston valve 60. Neither can fluid pass by the second seal 84 because a seal is formed between the ring outside diameter 74 and a passageway in the cylinder (not shown). Instead, the fluid flows through at least one vent 61 in the first end 64. Preferably, the first end 64 comprises a plurality of vents 63 through which hydraulic fluid flows into a counter bore 68 formed in the first end 64. The vents 61, 63 are positioned between the outside piston shaft diameter 162 and the counter bore diameter 168. Thus, the vents are in fluid communication with the first and second chambers. The first fluid chamber is subsequently charged with hydraulic fluid as long as the plurality of vents 63 do not pass the seal element 80, in particular the first seal 82 between the piston shaft outside diameter 162 and ring inside diameter 72. As will be shown in more detail, the piston valve 60 disrupts and terminates fluid flow between the first and second fluid chambers as the plurality of vents 63 pass by the seal element 80. The ring 70 may also include a bearing surface 76 to reduce friction between the ring 70 and piston valve 60 thus extending the life of the ring 70 and piston shaft 62. Another retention ring 91 may be used to retain the bearing surface 76 in a desired position.

Figure 8:
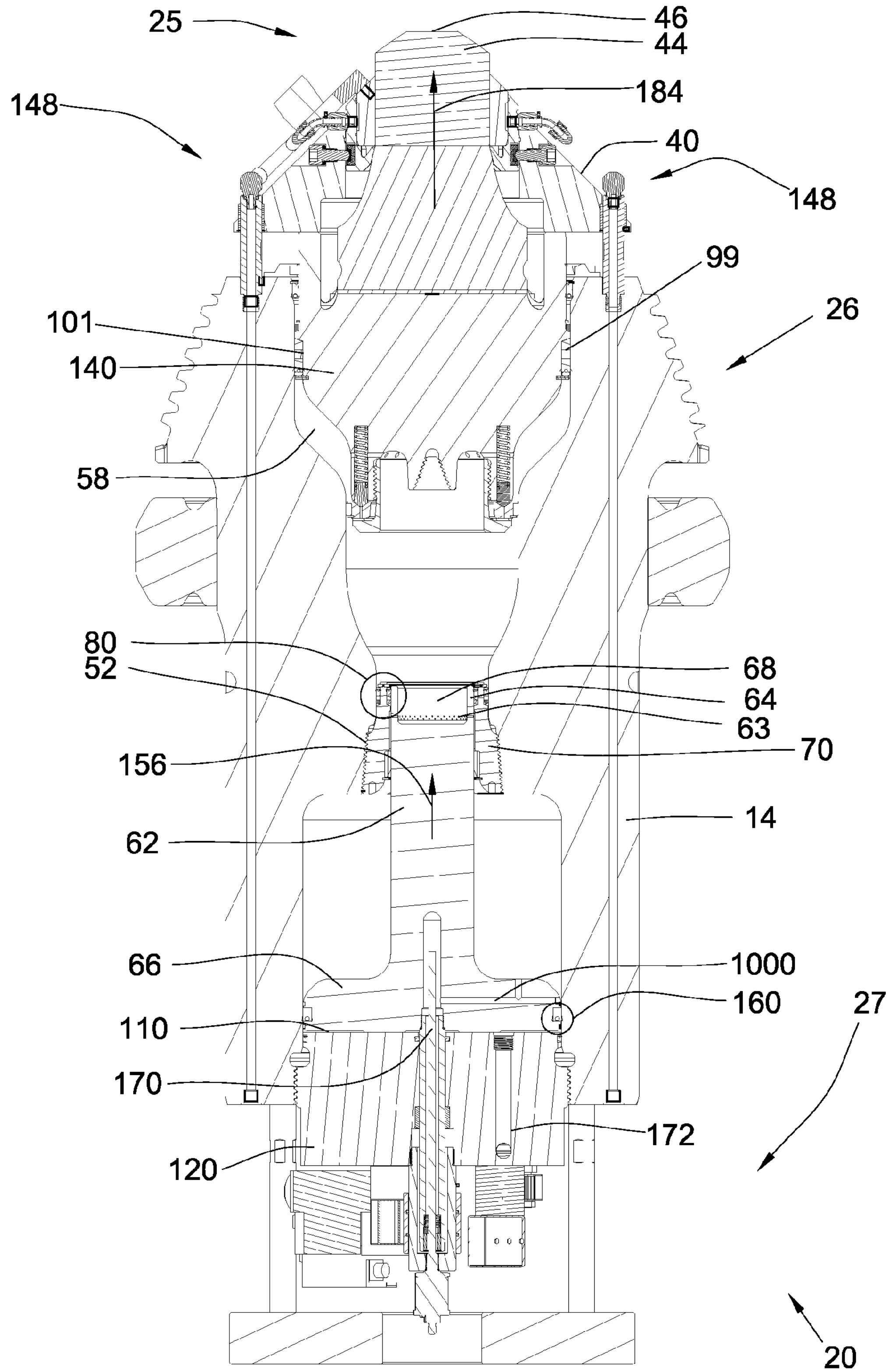
FIG. 8 is a cross-sectional diagram of another embodiment of a hydraulic cartridge.

Turning now to FIGS. 8-11, the movement of the piston valve 60 is represented as well as the intensification and release of hydraulic fluid in the first fluid chamber 50. FIG. 8 is a cross-sectional diagram of a piston valve 60 in a retracted position within a HPHT hydraulic cartridge 20. A hydraulic cartridge 20 includes a hydraulic end 27 and working end 25. The hydraulic cartridge comprises a truncated hollow conical section 26 and a cylinder 24. The working end 25 has three primary constituents, a key ring 40, a binding ring 42, and an anvil 44. The anvil face 46 cooperates with opposed anvil faces of the five remaining cartridges 20 and compresses against a reaction cell face during the press cycle elevating the internal pressure of the reaction cell to a level conducive to sintering superhard materials. The hydraulic end 25 further includes a manifold 120 through which hydraulic fluid, lines and equipment may pass. Tie rods 148 guide the key ring 40 as it is translated towards and away from the reaction cell. A main piston 140 placed within the first fluid chamber 50 encloses the first fluid chamber and is connected to a back 92 up through a Kevlar disc 222. The Kevlar disc 222 may electrically insulate the main piston 140 from the anvil 44. The Kevlar disc 222 may also provide additional support to the working end 25 during a pressing cycle. It is believed that a disc, particularly one made of Kevlar, may provide for a longer life of the press. It may also provide for increased durability over a similar metal disc. A piston valve 60 comprises a piston shaft 62 with a first and second end, 64 and 66, respectively. The first end 64 further includes a counter bore 68 preferably with a plurality of vents 63 between the piston shaft outside diameter and the counter bore diameter. The second end 66 is preferably disc shaped. However, the exact shape of the second end 66 may depend on the corresponding diameter of the second chamber 54.

The piston valve 60 is in a retracted position capable of extending in a direction 150 as depicted by the arrow. When in a retracted position, the second end 66 of the piston valve 60 is positioned proximate the manifold 120. The first end 64 of the piston valve 60 extends into the first fluid chamber 50. The ring 70 is disposed within a passageway 52 intermediate the first chamber 50 and second chamber 54. Preferably, the ring 70 is threaded into corresponding threads along the passageway surface. The seal element 80 prevents fluid to flow between the passageway 52 and the two fluid chambers 50, 54. Instead, fluid flows between the first and second chamber through the plurality of vents 63 and the counter bore 68. A seal 160 along the perimeter of the second end 66 prevents hydraulic fluid 110 from passing between the diameter of the second fluid chamber 54 and the perimeter of the second end 66. When the piston valve 60 is in a retracted position, the vents 63 are between the second fluid chamber 54 and the seal element 80 permitting fluid to pass between both fluid chambers 50 and 54. The piston 140 may move into an extended position, denoted by arrow 180. Fluid flows through a hydraulic line 170 and into the piston valve 60, through a port 1000, into the portion of the second chamber 54 between the second end 66 and the ring 70, into the space between the piston shaft 62 and ring 70, and through the vents 63 filling the counter bore 68 and consequently the first fluid chamber 50. The working end 25 may also comprise a conical back 92 up with an outer geometry that may also provide additional support to the working end 25 during a pressing cycle.

Figure 9:
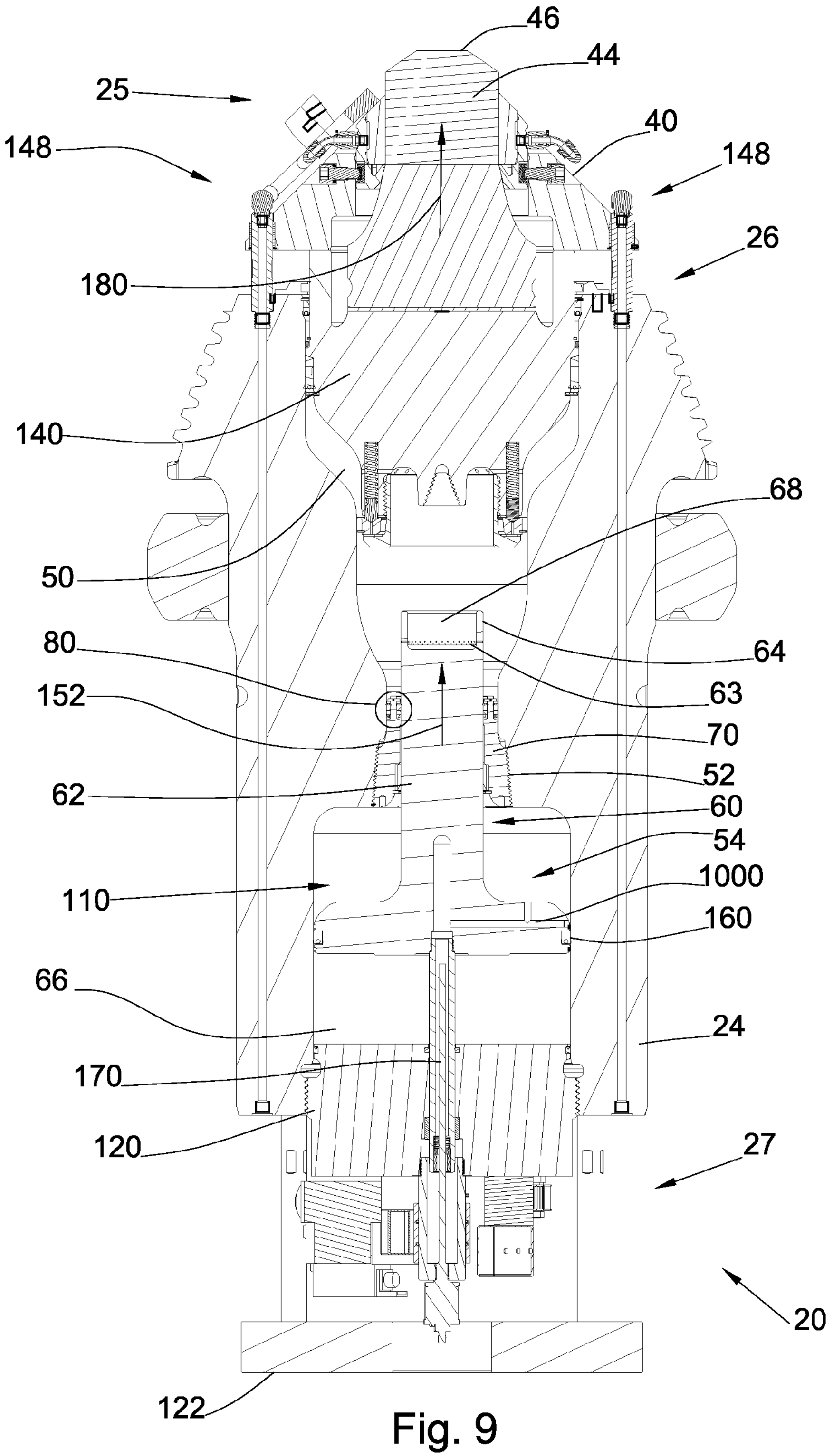
FIG. 9 is a cross-sectional diagram of another embodiment of a hydraulic cartridge.

FIG. 9 discloses the piston valve moving to an extended position from a retracted position as depicted by the arrow 152. The piston valve 60 moves forward, denoted by arrow 152, as the second fluid chamber 54 fills between the second end 66 and the manifold 120 with hydraulic fluid 110 through a manifold opening 172 causing the piston valve 60 to move into an extended position. As the vents pass the seal element 80, fluid communication between the two chambers cease, and the first fluid chamber 50 discontinues filling with fluid 110. Hydraulic fluid in the portion of the second chamber 54 between the second end 66 and the ring 70 passes through a port 1000 in the second end 66 of the piston valve 60 and back into the hydraulic line 170. When the cartridge is assembled in the press frame and performing a sintering operation, the movement of the piston 140 causes the working end 25 to extend until the anvil face 46 compresses against a reaction cell face.

Figure 10:
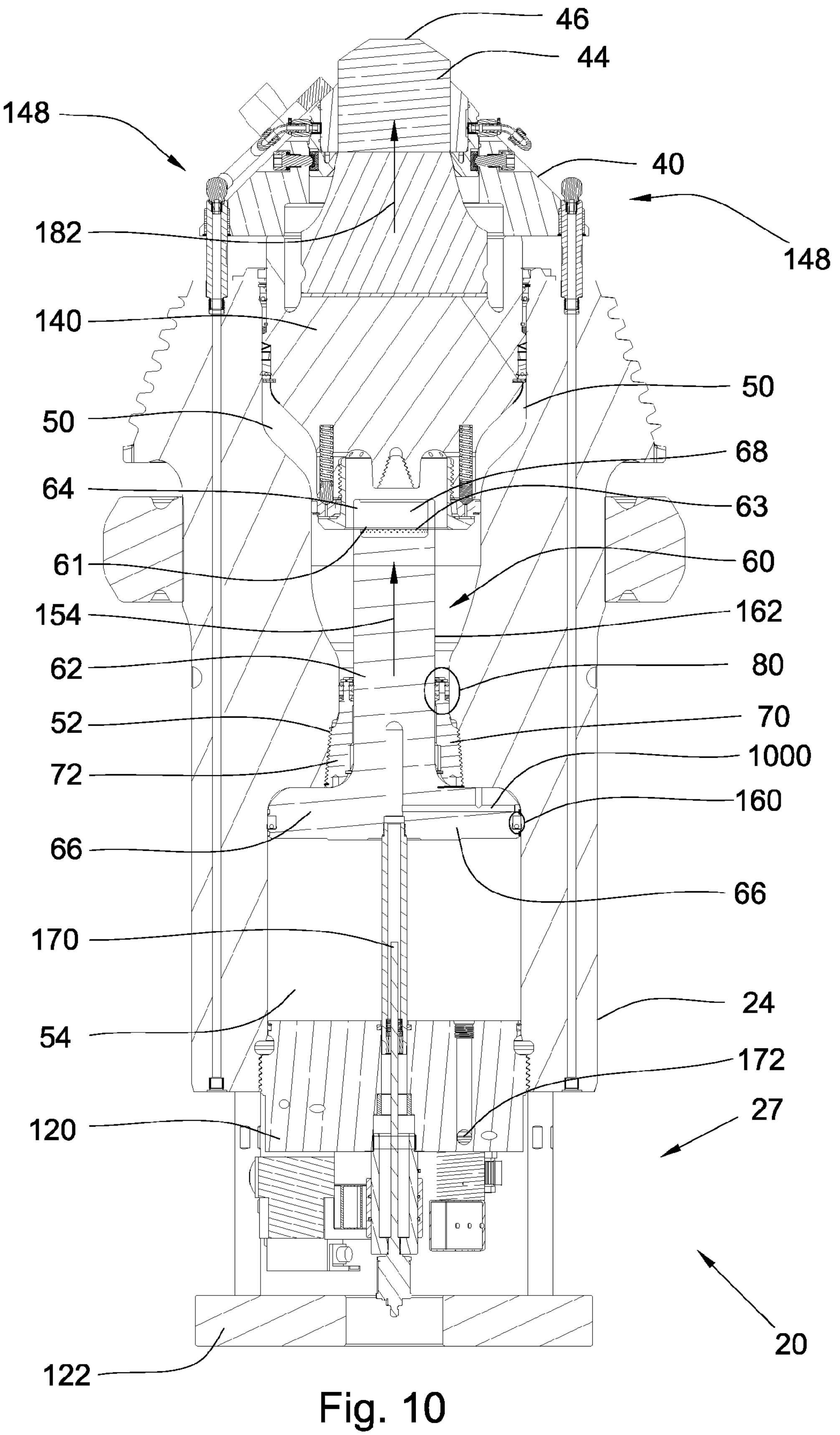
FIG. 10 is a cross-sectional diagram of another embodiment of a hydraulic cartridge.

FIG. 10 is discloses a piston valve in an extended position depicted by the arrow 154. As the vents 63 pass the seal element 80 and hydraulic fluid 110 continues to fill the second fluid chamber 54 between the second end 66 and the manifold 120, the piston valve 60 intensifies the fluid 110 in the first fluid chamber 50. The fluid is intensified to a maximum pressure when the piston valve 60 reaches a fully extended position 154 causing the piston 140 and anvil 44 to exert maximum force against the reaction cell as depicted by arrow 182. The varying geometries of the piston valve 60 working in combination with each other may provide for the intensification of the fluid. The second end 66 of the piston to the first end 64 of the piston may increase fluid pressure by a factor of 5 to 15. Also, the first end 66 of the piston to the anvil face 46 may provide for the fluid intensification process to increase pressure by a factor of 15 to 60.

Figure 11:
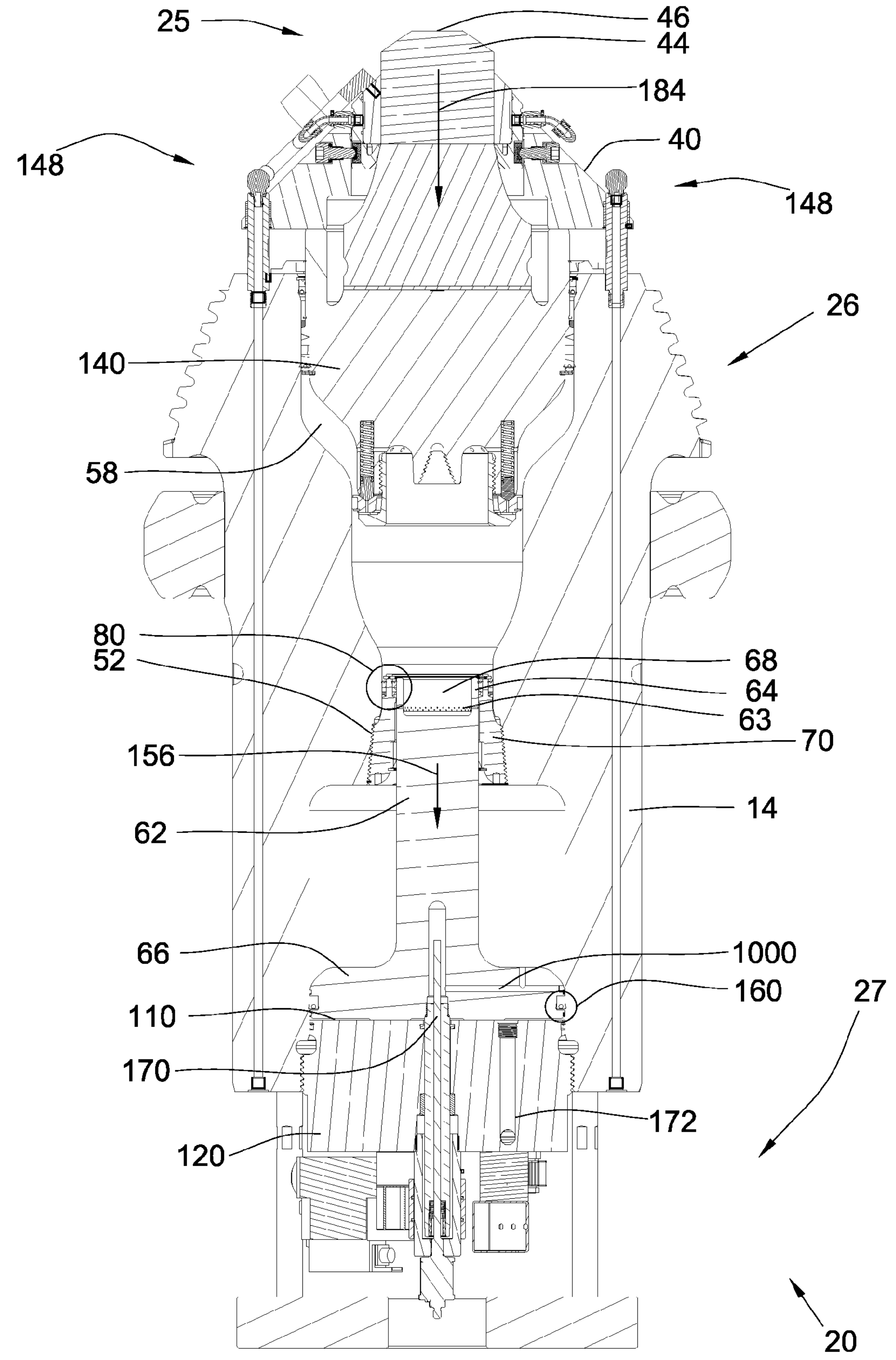
FIG. 11 is a cross-sectional diagram of another embodiment of a hydraulic cartridge.
Figure 12A:
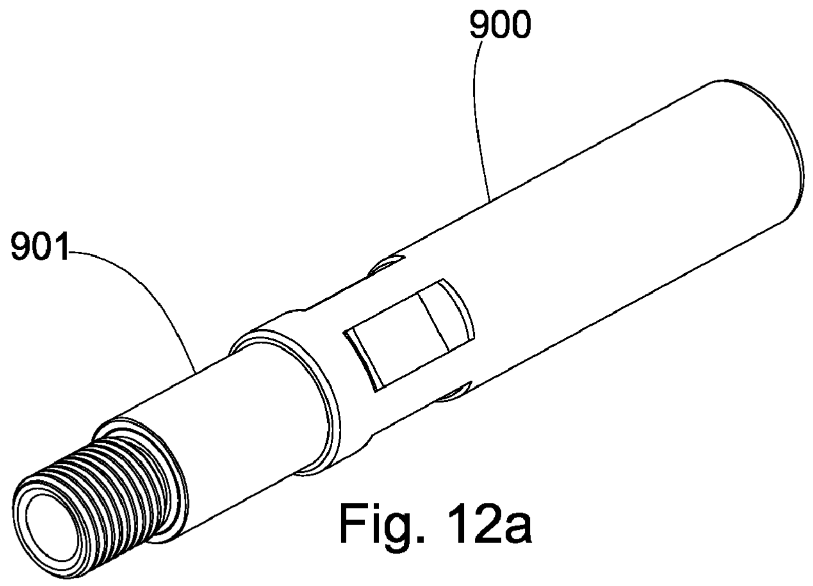
FIGS. 12*a-b* are perspective diagrams of embodiments of tie rods and bearings.
Figure 12B:
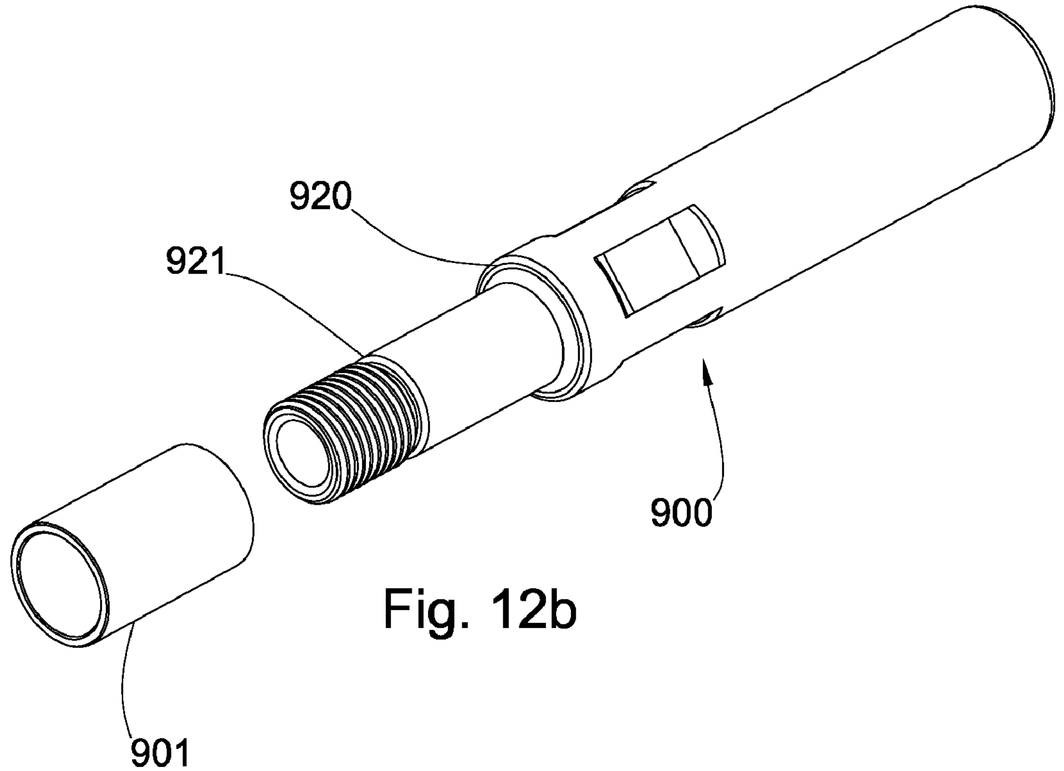
Figure 13A:
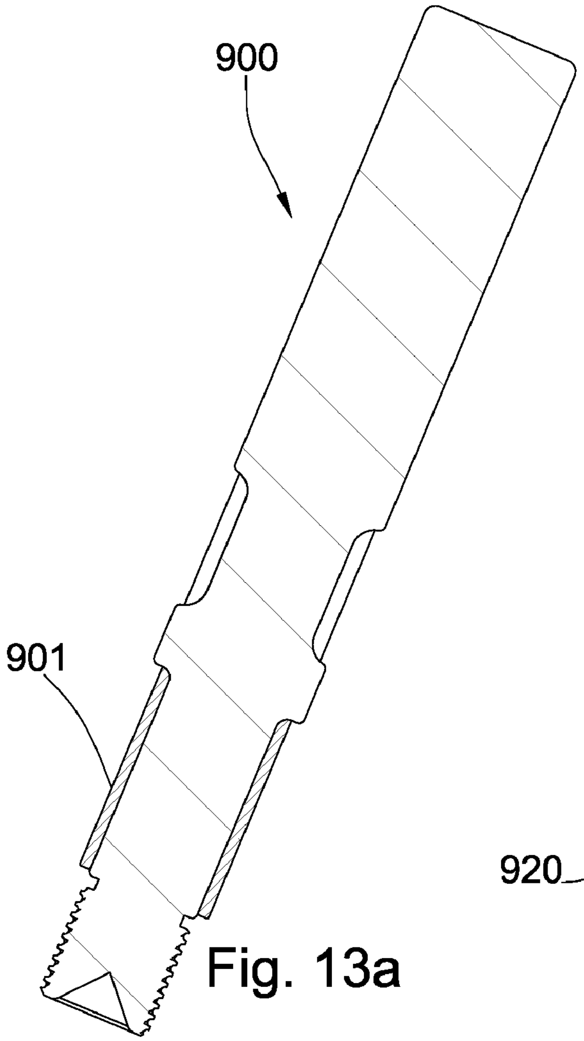
FIGS. 13*a-d* are cross-sectional diagrams of embodiments of a tie rods and bearings.
Figure 13B:
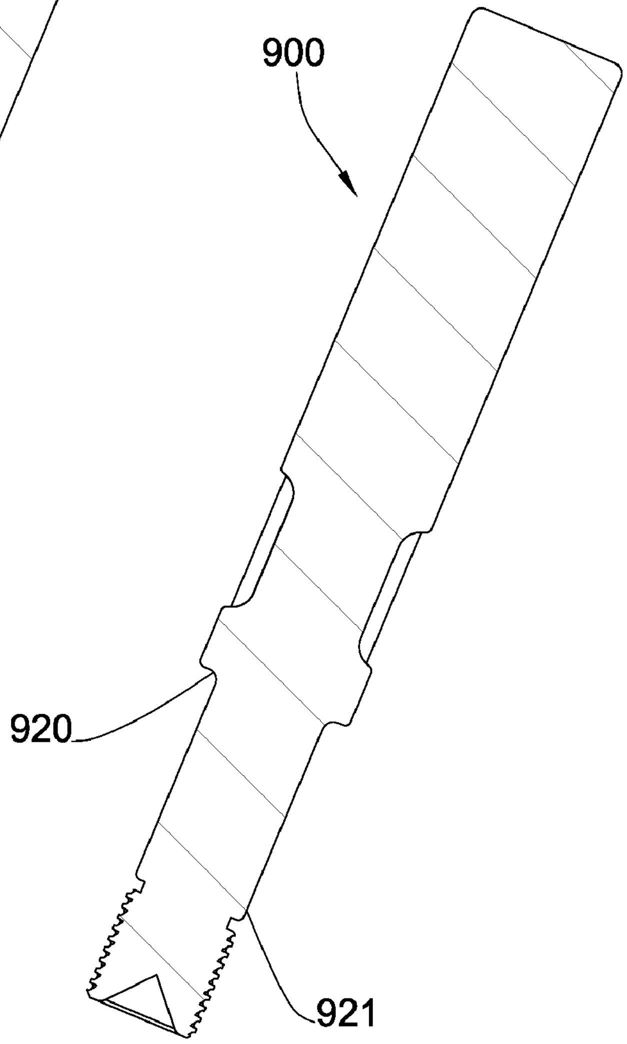
Figure 13B:
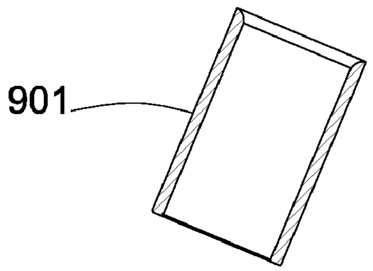
Figure 13C:
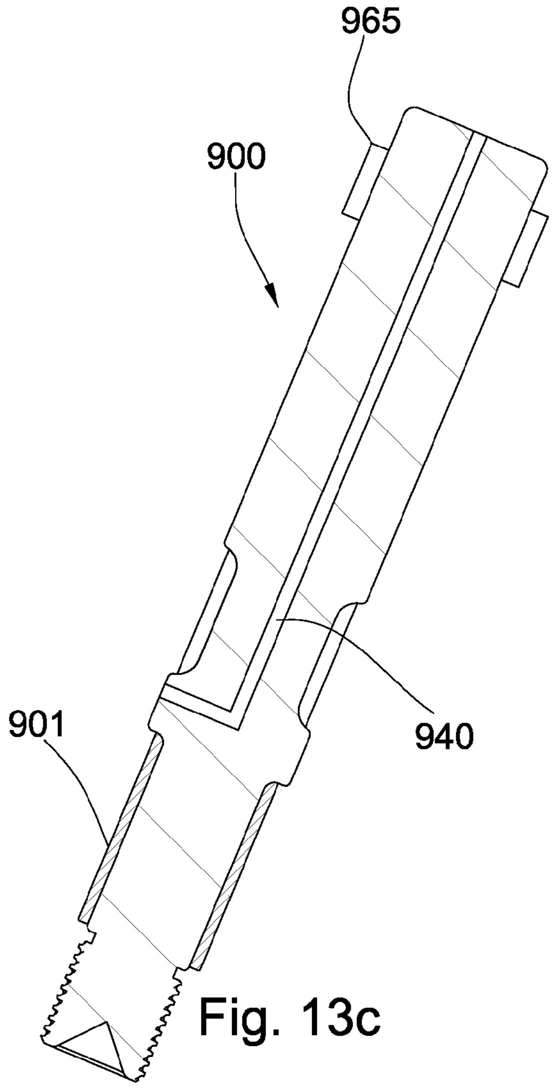
Figure 13D:
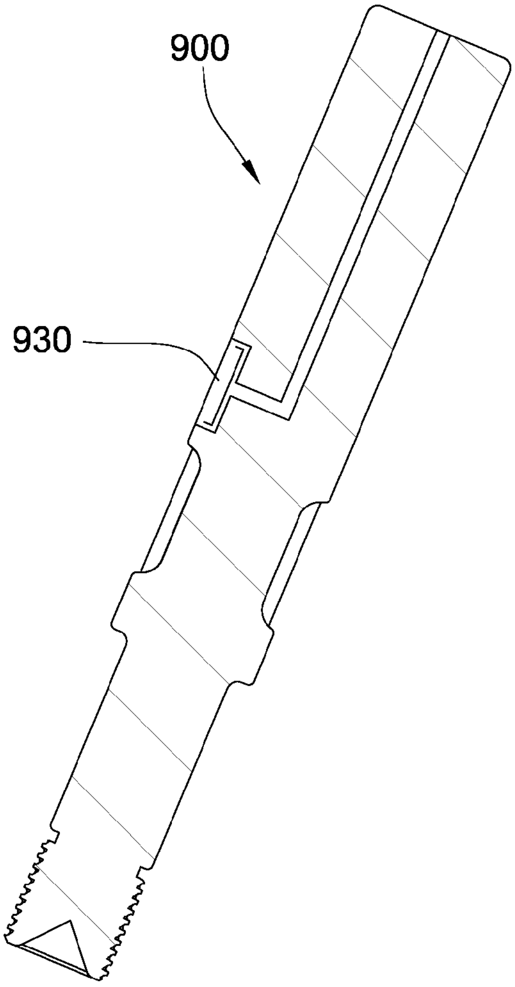
Figure 13D:
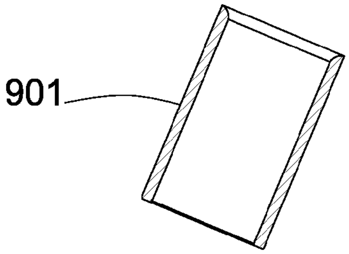

FIG. 11 discloses a piston valve moving from an extended position back to a retracted position. The working end 25 may retract from the reaction cell face, denoted by the arrow 184, as the pressurized fluid in the first chamber 50 is depressurized when the piston valve retracts. A third chamber 99 is pressurized to assist in the retraction of the piston valve 60. The third chamber 99 may be disposed adjacent the back up 92 and in fluid communication with a fluid passageway 101. Increasing the pressure in the third chamber 99 may aid in bringing the piston valve 60 into a retracted position. The third chamber 99 may be pressurized with a hydraulic fluid such that the pressure from the fluid exerted on the back up 92 causes the back up 92 to retract. The tie rods 148 may comprise a removable feature adapted to allow the press operator to remove the tie rod 148 in the event of a rod failure. The removable feature 965 may comprise a notch in the tie rod 900, a protrusion such that the notch or protrusion may fit around a protrusion or within a notch that twists to lock in place.

FIGS. 12*a-b* and 13*a-d* disclose embodiments of a tie rod 900 with a bronze bearing 901. The tie rod 900 may comprise 40 series steel with chrome plating, high strength steel, or stainless steel. The bronze bearing may function to cushion any side load to the tie rod during a catastrophic failure of the press or press cartridge. The bronze bearing 901 may prevent damage from occurring to the tie rod port in the cartridge by absorbing forces on the tie rod. This may preserve the functionality of the tie rod port in the event of a catastrophic event to the cartridge. The tie rod 900 may also comprise two overload failure points 920, 921 designed to preferentially break, thus protecting the cartridge from failure if overloaded with a side load. These overload failure points 920/921 may ensure easy removal of any piece of the tie rod 900 from the cartridge 20 in the event of catastrophe. The tie rod 900 may also comprises a lubrication system 930 adapted to self-lubricate the rod 900. The tie rod 900 may also comprise a port 940 adapted to allow coolant to flow from the tie rod 900 to the key ring 40. The tie rod 900 may also comprise a raised geometry 899 adapted to interlock with the key ring 40. The tie rod 900 may also comprise a recessed portion 898 adapted to interlock with the key ring 40.

Figure 14:
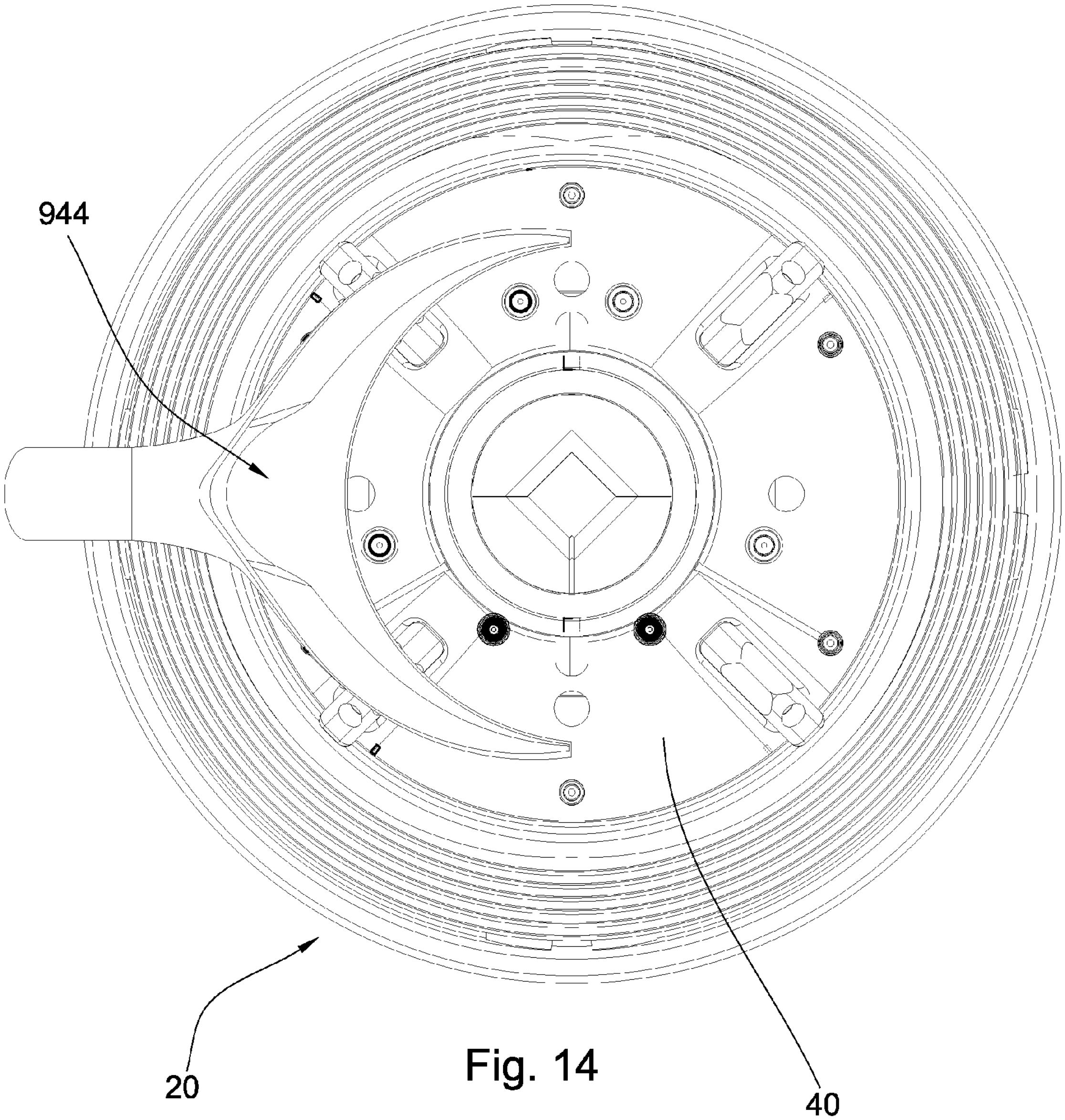
FIG. 14 is an orthogonal diagram of an embodiment of a hydraulic cartridge.

FIG. 14 is a top orthogonal diagram of an embodiment of a cartridge 20 with a receptacle 944 that is adapted to collect loose debris from the pressing cycle. The receptacle 944 may comprise a funneled geometry and a vacuum mechanism adapted to assist in collecting the loose debris from the pressing cycle. The receptacle may be formed in the front end of the cartridge or it may be an attachable component. The debris collected in the receptacle may be manually cleaned or automatically cleaned such as through a suctioning mechanism, conveying mechanism, fluid mechanism or combinations thereof.

Figure 15:
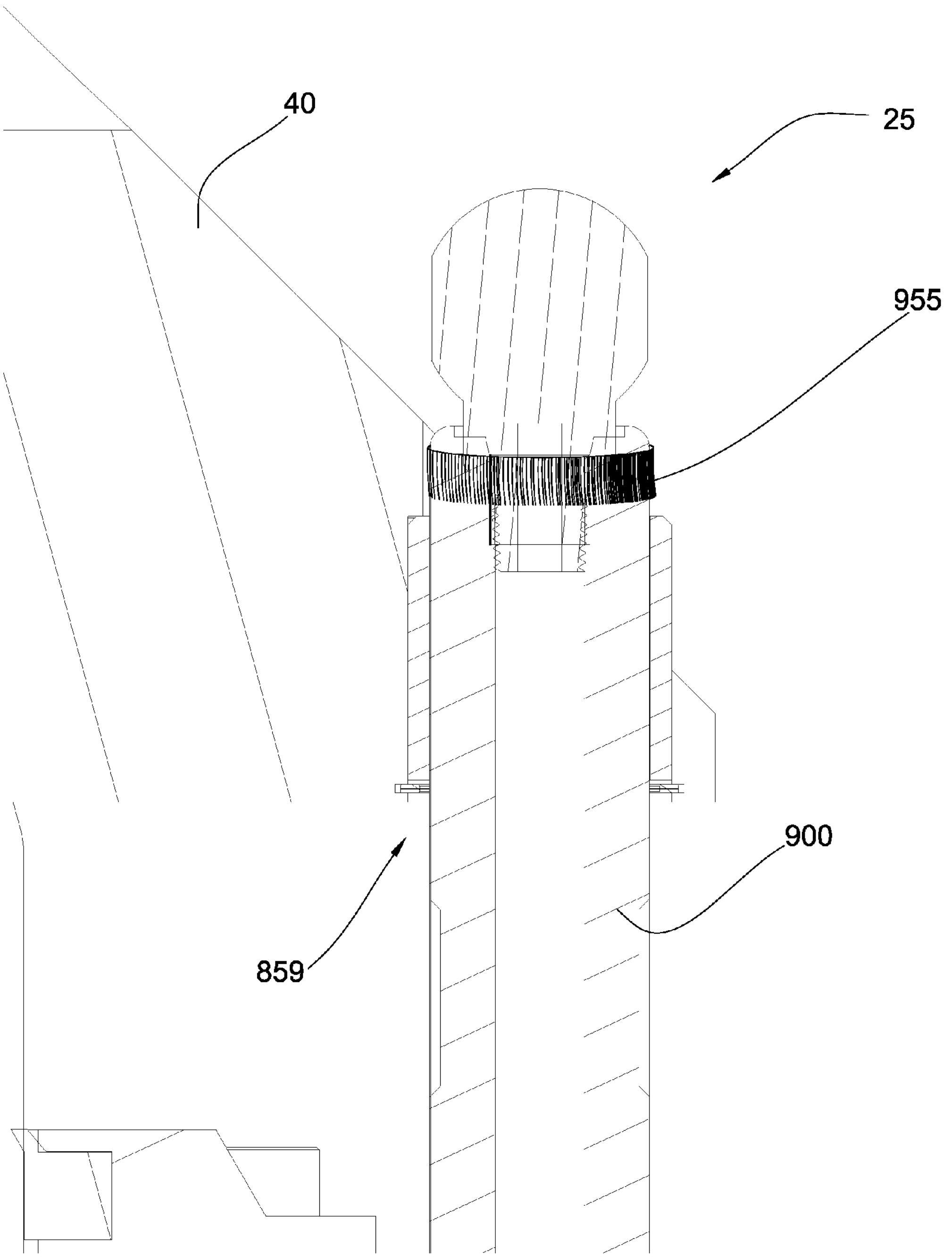
FIG. 15 is a cross-sectional diagram of an embodiment of a tie rod.

FIG. 15 shows a cross-sectional view of a portion of the working end 25. The key ring 40 may also comprise a cleaning mechanism 955, such as a wipe or brush, fixed around and a tie rod hole. The cleaning mechanism is adapted to clean the tie rod as the rod translates with respect of the hole during the pressing cycle or in instances when the key ring 40 is advanced forward or retracted along the tie rod 900. The key ring 40 may be adapted to slide over the rod 900, wherein the key ring 40 may comprise a peripheral bore 859.

Figure 16:
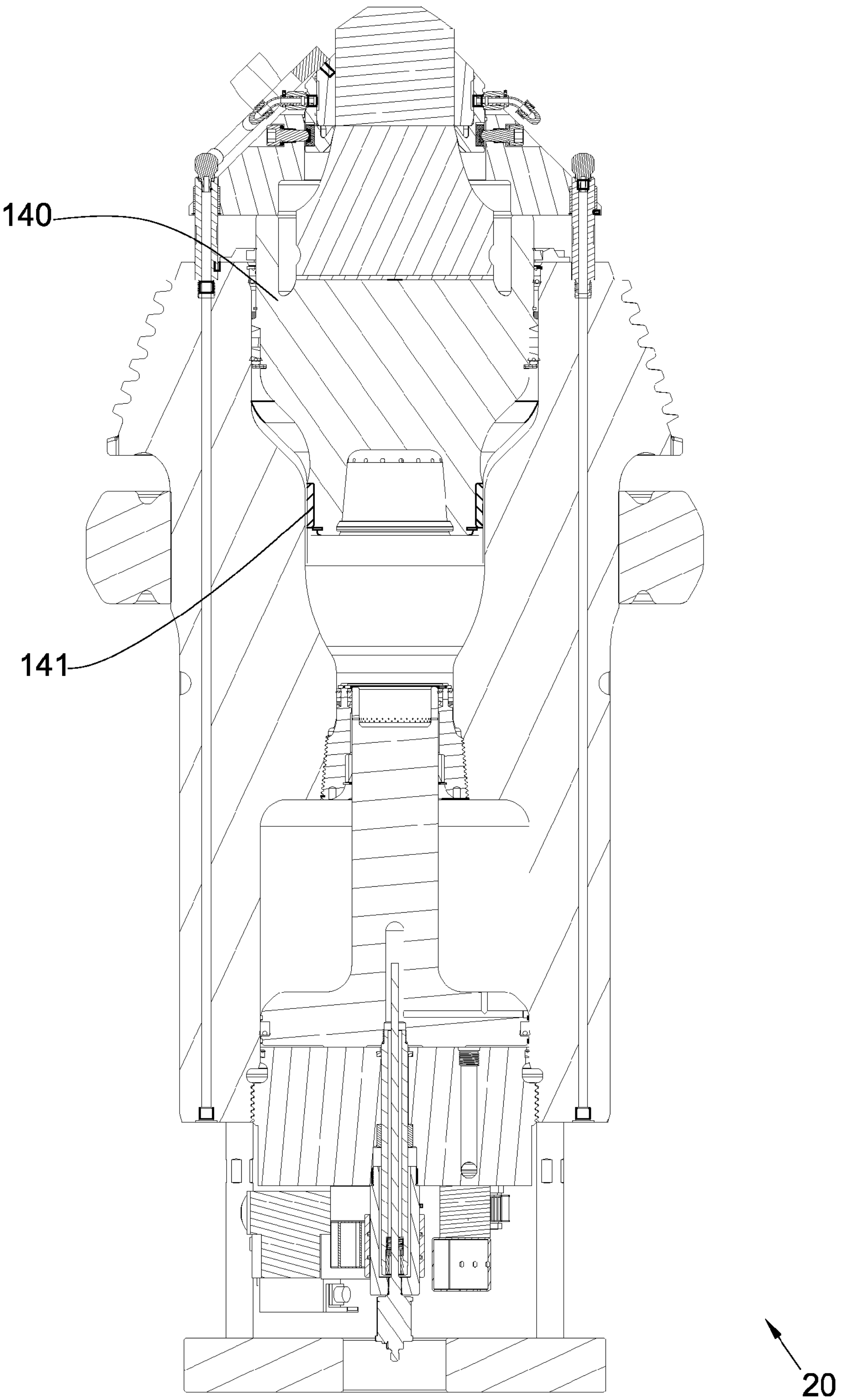
FIG. 16 is a cross-sectional diagram of another embodiment of a hydraulic cartridge.

FIG. 16 discloses a cross-sectional diagram of another embodiment of a press cartridge 20. In this embodiment, the piston 140 comprises a linear bearing 141. The linear bearing 141 is mounted on the piston 140 such that the piston 140 substantially rigidly retracts and extends within the cartridge 20.

The features of the present invention may be compatible is high temperature, high pressure presses, forging presses, solid frame presses, open frame presses, three-axes presses, tetrahedral presses, belt presses, and combinations thereof.

Whereas the present invention has been described in particular relation to the drawings attached hereto, it should be understood that other and further modifications apart from those shown or suggested herein, may be made within the scope and spirit of the present invention.

What is claimed is:

1. A cartridge assembly of a high pressure, high temperature press, comprising:

a front end comprising an anvil and a coaxial piston;

the piston being connected to a centering mechanism opposite the anvil;

the centering mechanism being located in a same bore of the cartridge as the piston and being stabilized by the bore's diameter;

the centering mechanism comprising an urging element adapted to align the piston.

2. The cartridge assembly of claim 1, wherein the urging element is a compression spring.

3. The cartridge assembly of claim 1, wherein the urging element is located inside a receptacle formed in the mechanism.

4. The cartridge assembly of claim 1, wherein the urging element is located outside a receptacle formed in the mechanism.

5. The cartridge assembly of claim 1, wherein the centering mechanism comprises a bearing surface adapted to contact a wall of the bore.

6. The cartridge assembly of claim 1, wherein the piston is connected to the centering mechanism through a threadform.

7. The cartridge assembly of claim 1, wherein the piston is connected to the centering mechanism through a press fit.

8. The cartridge assembly of claim 1, wherein the piston comprises a detachable handle proximate the centering mechanism and within a retraction port.

9. The cartridge assembly of claim 8, wherein the handle is substantially coaxially aligned with the central axis of the cartridge.

10. The cartridge assembly of claim 8, wherein the retraction port is substantially conical.

11. The cartridge assembly of claim 1, wherein the piston comprises a locking feature disposed in a wall of the piston and adapted to secure the centering mechanism to the piston.

12. The cartridge assembly of claim 11, wherein the locking feature is a pin inserted in a through hole disposed in a wall of the piston.

13. The cartridge assembly of claim 1, wherein the centering mechanism comprises a fixture disposed partially within the piston and on a peripheral edge of the piston and comprising a contact end such that the contact end contacts a receptacle disposed coaxial with and in the same bore as the piston.

14. The cartridge assembly of claim 13, wherein a contact end of the fixture is adapted to translate along a recess geometry when a lateral force is applied to the front end such that the fixture travels in an axial and lateral direction.

15. The cartridge assembly of claim 13, wherein the urging element is connected to the fixture and adapted to apply a force to the piston when compressed such that the force causes the piston to align its axis with the axis of the cartridge.

16. The cartridge assembly of claim 13, wherein a first end of the fixture has a diameter larger than a diameter of a second end such that the fixture comprises a substantially conical shape.

17. The cartridge assembly of claim 13, wherein the receptacle has a larger diameter than a diameter of the first end of the fixture.

18. The cartridge assembly of claim 1, wherein the centering mechanism comprises an inner diameter adapted to allow a second piston to be inserted into the centering mechanism.

19. The cartridge assembly of claim 1, wherein the press is a forging presses, solid frame presses, open frame presses, three-axes presses, tetrahedral presses, belt presses, and combinations thereof.

* * * * *